(12) United States Patent
Fitzpatrick et al.

(10) Patent No.: US 7,774,409 B2
(45) Date of Patent: *Aug. 10, 2010

(54) PROVIDING COMMON CONTACT DISCOVERY AND MANAGEMENT TO ELECTRONIC MAIL USERS

(75) Inventors: Gregory P Fitzpatrick, Keller, TX (US); Frederick Yung-Fung Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 1594 days.

This patent is subject to a terminal disclaimer.

(21) Appl. No.: 10/228,718

(22) Filed: Aug. 27, 2002

(65) Prior Publication Data

US 2004/0044536 A1 Mar. 4, 2004

(51) Int. Cl.
*G06F 15/16* (2006.01)
(52) U.S. Cl. ............... 709/206; 709/232; 709/217
(58) Field of Classification Search ................ 709/206, 709/207
See application file for complete search history.

(56) References Cited

U.S. PATENT DOCUMENTS

| | | | |
|---|---|---|---|
| 5,884,323 A * | 3/1999 | Hawkins et al. ............. 707/201 |
| 6,073,138 A | 6/2000 | de l'Etraz et al. ........... 707/104 |
| 6,108,651 A | 8/2000 | Guha ............................. 707/4 |
| 6,151,620 A | 11/2000 | Madsen et al. .............. 709/204 |
| 6,189,026 B1 | 2/2001 | Birrell et al. ................ 709/206 |
| 6,360,251 B1 * | 3/2002 | Fujita et al. ................. 709/206 |
| 6,922,410 B1 * | 7/2005 | O'Connell ................... 370/401 |
| 7,003,551 B2 * | 2/2006 | Malik .......................... 709/206 |
| 7,016,937 B1 * | 3/2006 | Malik .......................... 709/206 |
| 7,103,634 B1 * | 9/2006 | Ullmann et al. ............. 709/206 |
| 7,177,594 B2 * | 2/2007 | Burr ............................ 455/41.2 |
| 7,265,858 B2 * | 9/2007 | Park et al. ................... 358/1.15 |
| 2002/0052921 A1 * | 5/2002 | Morkel ........................ 709/206 |
| 2002/0065892 A1 * | 5/2002 | Malik .......................... 709/206 |
| 2002/0107991 A1 * | 8/2002 | Maguire et al. ............. 709/250 |
| 2003/0036914 A1 * | 2/2003 | Fitzpatrick et al. ............ 705/1 |
| 2003/0045272 A1 * | 3/2003 | Burr ............................ 455/411 |
| 2003/0046433 A1 * | 3/2003 | Luzzatti et al. ............. 709/248 |
| 2003/0050933 A1 * | 3/2003 | DeSalvo ...................... 707/102 |
| 2003/0171942 A1 * | 9/2003 | Gaito ............................. 705/1 |
| 2007/0208747 A1 * | 9/2007 | Puckrin ....................... 707/10 |

OTHER PUBLICATIONS

U.S. Appl. No. 09/464,887, filed Dec. 16, 1999, McGinniss, Jr., et al.
U.S. Appl. No. 09/714,759, filed Nov. 16, 2000, Ullmann, et al.

(Continued)

*Primary Examiner*—William C Vaughn, Jr.
*Assistant Examiner*—Joiya M Cloud
(74) *Attorney, Agent, or Firm*—Novak Druce + Quigg

(57) ABSTRACT

The present invention relates to a process for discovering contacts common to a sender and a recipient of an electronic message (e-mail). The method can include identifying an attachment to the e-mail wherein the attachment includes a list of contacts personal to the sender. A list of contacts personal to the recipient can be retrieved. Each of the lists of contacts can be parsed and compared to identify common contacts. A common contact list can be populated with the identified common contacts.

12 Claims, 2 Drawing Sheets

OTHER PUBLICATIONS

Using Associations to Send Mail to Unknown User IDs, *IBM Technical Disclosure Bulletin*, vol. 37, No. 2B, pp. 613-614, (Feb. 1994).

*True Peers—Networking Advice*, <http://www.truepeers.com/faqs.asp?sid=amnniwibbthf>, (viewed May 8, 2001).

*FileMaker Cafe: What is UBB Code?*, <http://www.maclane.com/cgi-bin/ultimatebb.cgi?ubb+ubb_code_page>, (viewed May 8, 2001).

Userid Search for Carbon-Copied Mall Recipients, *IBM Technical Disclosure Bulletin*, vol. 37, No. 3, pp. 485-486, (Mar. 1994).

* cited by examiner

PROVIDING COMMON CONTACT DISCOVERY AND MANAGEMENT TO ELECTRONIC MAIL USERS

BACKGROUND OF THE INVENTION

1. Technical Field

The present invention relates generally to discovering common contacts among individuals, and more particularly, to facilitating that contact discovery via electronic mail communication.

2. Description of the Related Art

In today's society, businesses and individuals alike prefer to associate with individuals whom they can trust. One way to establish trust between two parties who are unfamiliar with each other is to identify at least one third person who is a mutually trusted acquaintance of both parties, or a common contact. The identification of at least one common contact can immediately foster a sense of trust between the two parties, which in turn can facilitate the exchange of information necessary to develop stronger relationships. For example, by identifying at least one mutually trusted common contact, two formerly unacquainted coworkers can quickly discover shared interests and purposes which can promote collaboration. Similarly, two individuals who are introduced in a social context can immediately form a bond when they discover they share at least one trusted common contact.

Additionally, the discovery of common contacts can help to broaden one's business and social networks by providing a source for referrals and introductions. For example, businesses and organizations often discourage cold-calling. Therefore, an individual who is seeking an initial meeting with an organization can appear more trustworthy and legitimate if introduced or referred by a mutually trusted common contact shared by both the seeking individual and the organization. Similarly, in a social context, if individual "A" has an interest in interacting with individual "B", ideally "A" should be introduced to individual "B" by a mutually trusted common contact. Alternatively, if the common contact cannot be physically present to make introductions, it can be less socially awkward for "A" to approach "B" with at least the knowledge that the two individuals share a common contact.

Unfortunately, many individuals not only remain unaware of the existence of common contacts, but most individuals lack an effective means of discovering common contacts. Presently, common contacts are discovered via face to face interaction and lengthy conversation; however, given time constraints in the workplace, and people's reluctance to initiate conversation with strangers, this approach is often untenable. Moreover, this method relies on the often inaccurate and limited mental recollections of individuals.

While recent technological advancements may improve one's ability to communicate with others, the same advancements have had an adverse impact on an individual's ability to discover common contacts. Given the popularization of the Internet and the World Wide Web, electronic mail has become, in many instances, the preferred medium for both business and personal communication. Yet, since electronic mail often precludes face to face interaction, and therefore the conversation required to discover common contacts, electronic mail correspondents often know each other only superficially. Hence, what is needed is a programmatic method for discovering common contacts between electronic mail correspondents in order to strengthen relationships, facilitate the broadening of business and social networks, and eliminate the limitations of imprecise human recollection.

SUMMARY OF THE INVENTION

The present invention relates to a process for discovering contacts which are common to a sender and a recipient of an electronic message (e-mail). In particular, the process can include the identification of an attachment to an e-mail which contains a list of contacts which are personal to the sender. Subsequent to the identification of the attachment containing a list of contacts personal to the sender, the process can include the retrieval of a list of contacts which are personal to the recipient. The process can then include parsing the contact lists belonging to both the e-mail sender and the recipient, and comparing the parsed lists in order to identify any contacts common to the sender and the recipient. Subsequently, the invention can include the generation of a common contact list that contains the identified common contacts. After the common contact list has been generated, a copy of the common contact list can be forwarded to the sender.

In one aspect of the invention, when a sender makes a request to send an e-mail by selecting an addressee, the system can automatically determine whether the addressee is included as a contact in one or more of the sender's personal lists of contacts. If the addressee has not been included in any of the sender's personal lists of contacts, the system can automatically prompt the sender to attach his or her list of contacts to the e-mail. In another aspect of the invention, the system can automatically prompt the sender to attach at least one list of contacts corresponding to an e-mail correspondent, other than the sender and the recipient, based on an application-specific algorithm. The contact list can be identified as belonging to an e-mail correspondent other than the sender and the recipient.

In yet another aspect of the system, contacts common to a group of correspondents and a new member of the group can be discovered using the inventive arrangements disclosed herein. Notably, a new member of the group is defined as a new e-mail correspondent who has not yet undergone a common contact search to identify contacts in common with the group of correspondents. According to this aspect of the invention, when a sender makes a request to send an e-mail by entering the address of a recipient, the system can automatically determine whether the recipient of the e-mail is a member of the group or a new member. If the recipient is identified as a new member of the group, the system can retrieve a single list of contacts which are common to all members of the group of correspondents. The system can then prompt the sender to attach the single list of contacts to the e-mail before the e-mail is forwarded to the new member of the group. Upon receiving an email with the single list of contacts common, to all members of the group of correspondents attached, the new member of the group can generate a list of contacts which are common to the new member of the group and the group of correspondents. Subsequently, the new member of the group can replace the single list of contacts with a new list of contacts. The new list of contacts can include contacts common to both the new member as well as the group of correspondents.

This aspect of the invention can include the identification of an attachment to an e-mail, forwarded by a member of the group of correspondents, which can include a list of contacts common to the group of correspondents. Subsequent to the identification of the attachment which includes a list of contacts common to the group of correspondents, the process can include the retrieval of a list of contacts which are personal to the new member. The process can then include parsing the contact lists belonging to both the group of correspondents and the new member, and comparing the parsed lists in order to identify any common contacts the new member may share with the group of correspondents. Subsequently, the invention can include the generation of a common contact list that contains the identified common contacts. After the common contact list has been generated, a copy of the common contact list can be forwarded to the sender, who is a member of the group of correspondents.

Another aspect of the present invention can include a method for discovering contacts of a group of correspondents and a new member of the group. The method can include identifying a request to send an e-mail to a new correspondent who had not previously been included as part of the group of correspondents. Responsive to identifying the new correspondent, a single list of contacts representing a union of contacts of each member of the group of correspondents can be retrieved. The single list of contacts can be attached to the e-mail before the e-mail is forwarded to the new correspondent. The new correspondent can generate a list of contacts representing a union of contacts of the new correspondent and the group of correspondents. Accordingly, the single list of contacts can be replaced with a list of contacts generated by the new correspondent.

This aspect of the present invention further can include identifying an attachment to an e-mail which had been forwarded by a member of the group of correspondents. The attachment can include a list of contacts representing a union of contacts of each member of the group of correspondents. A list of contacts which are personal to the new member can be retrieved. Each of the list of contacts can be parsed and compared to identify contacts from the list of contacts of the new member which are not included in the contacts of the group of correspondents. A new contact list can be populated with the identified contacts. The new contact list can be forwarded to the member of the group of correspondents. The new contact list can represent a union of contacts of the new member and the group of correspondents.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and system for the identification of common contacts using electronic mail so that electronic mail correspondents can develop close relationships despite the attendant lack of face to face interaction. This process can result in the improvement of business and social interactions, such as improved collaboration in the workplace, or accelerated bonding in a social context. Additionally, since common contacts can provide an excellent source for introductions or referrals, the present invention can assist in broadening business and social networks. Moreover, the programmatic capabilities inherent in electronic mail transactions can provide a more accurate mechanism for discovering common contacts, rather than depending on imprecise human recollections, or painstakingly comparing contact lists stored on paper media, such as a ROLODEX.

In the present invention, users equipped in accordance with the inventive arrangements can exchange private, public, or application-specific contact lists via electronic mail correspondence. Subsequent to the exchange of contact lists, the contacts contained therein can be compared in order to discover common contacts among two or more users. Typically, the aforementioned contact lists can be in the form of electronically stored personal address books, buddy lists commonly associated with instant messenger clients, address books provided with personal digital assistants, cell phone contacts lists, mobile phones, and the like. If a contact list stored in paper form is to be used with the invention, it must be converted into a file format using any conventional method known in the art. Each contact contained in a contact list can have one or more identifiers ranging from a single electronic mail address, to other relevant personal data such as name, phone number, home address, and the like.

Figure 1:
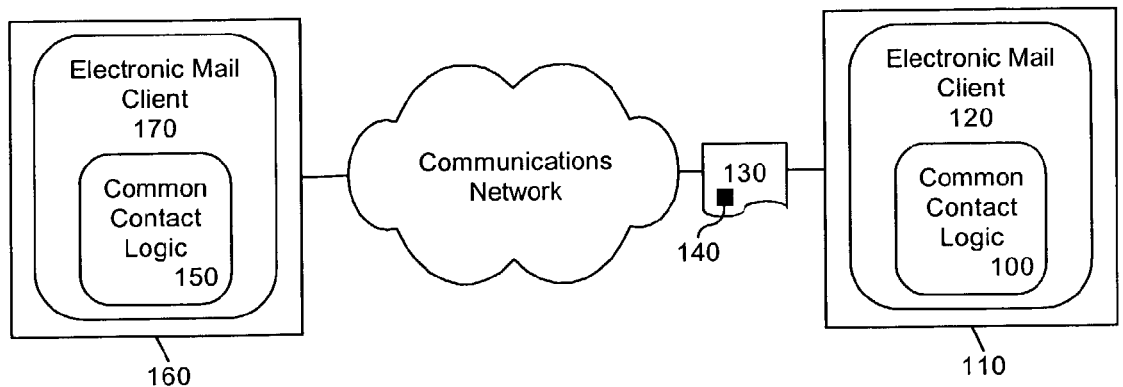
FIG. 1 is a schematic diagram illustrating a system for identifying common contacts among electronic mail correspondents.

FIG. 1 is a schematic diagram illustrating a system for identifying common contacts among electronic mail correspondents. The system can include a sender 160, for example, an individual equipped with any conventional device capable of sending electronic mail over a communications network. The conventional device capable of sending electronic mail can have an electronic mail client 170 configured to read electronic mail. Furthermore, electronic mail client 170 can have common contact logic 150 which can be configured to identify common contacts among users. The system also can include at least one recipient 110. The recipient 110 can be an individual equipped with any conventional device capable of receiving electronic mail over a communications network. The conventional device of the recipient 110 can have an electronic mail client 120 configured to read electronic mail. Moreover, the electronic mail client 120 can contain common contact logic 100 which can be configured to identify common contacts among users.

In operation, a method for generating a list of common contacts shared by at least two electronic mail correspondents can begin with a sender selecting an electronic mail recipient, and attaching to the electronic mail at least one contact list, or link thereto. In particular, the sender 160 can select recipient 110 as an addressee of an electronic mail 130 by entering a unique address identifier for the recipient 110. In one aspect of the present invention, the sender 160 can manually attach to the electronic mail 130 at least one private, public, or application-specific contact list, or link thereto 140, using a conventional method known in the art. In yet another preferred aspect of the invention, the system can automatically prompt the sender 160 to attach at least one contact list, or link thereto, which can be programmatically selected based on an application-specific algorithm. For example, the system can be configured to determine whether the recipient 110 has been included in a list of contacts which are personal to the sender 160. If the system identifies that the recipient 110 has not been included in a list of contacts which are personal to the sender 160, then the system can prompt the sender 160 to attach at least one list of contacts which are personal to the sender 160.

Figure 2:
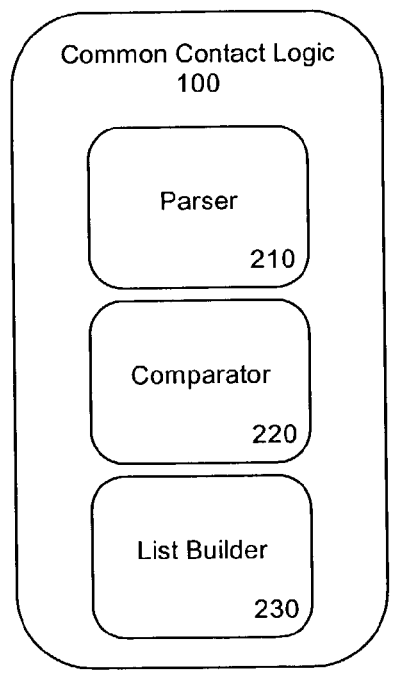
FIG. 2 is a schematic illustration of the common contact logic of the system of FIG. 1.

FIG. 2 is a schematic illustration of the common contact logic 100 depicted in FIG. 1. The common contact logic 100 can include a parser 210, a comparator 220, and a list builder 230. The parser 210 can examine and extract the relevant data for comparison, and store it in a suitable format. The comparator 220 can then accept the parsed data from the parser 210 and compare the data in order to find matches. The list builder 230 can be configured to create a list of items provided by the comparator 220 which can be stored in any conventional manner including a link list, stack, flat file, array, and the like.

In operation, once the electronic mail message 130 has been forwarded with at least one personal contact list associated with the sender 160 attached, it can be received by the electronic mail client 120. Subsequent to the identification of at least one attached contact list, the common contact logic 100 can, in turn, retrieve a list of contacts which are personal to the recipient 110. Notably, the contact lists can be stored in file arrangements ranging from a single text file to a multi-list database. Since the various sources for the contact lists (i.e. phone books, PDA's) store data differently, the parser 210 can initiate the search for common contacts by parsing through the lists of contacts associated with the sender 160 and the personal list of contacts belonging to the recipient 110. The parser function can include extracting and converting the data into a format usable by the comparator 220. For example, the parser 210 may extract last and first names only from each contact list entry in order for the comparator 220 to search and compare contacts by first and last names. Still, it should be appreciated that other data such as e-mail addresses, telephone numbers, and the like can be compared. Subsequently, the comparator 220 can compare the parsed data to determine whether a contact contained in the contact list associated with the sender 160 matches a contact in the list of contacts belonging to the recipient 110.

Once the comparator has completed comparing all the contacts found in the respective lists of contacts, the list builder 230 can be configured to compile a generated common contact list containing all matches found. A copy of the generated common contact list can remain with the recipient 110, while another copy can be forwarded to the sender 160. Notably, contacts stored in the generated common contact list can have one or more identifiers ranging from a single electronic mail address, to other relevant personal information such as a name, a phone number, a home address, and the like. Additionally, while the individual contacts contained in the contact lists attached to the electronic mail 130 can be made visible to the recipient 110, for security purposes, a preferred aspect of the invention can provide for only the generated common contact list to be accessible, while the contact list or lists attached to the electronic mail 130 can be restricted from view.

In another aspect of the invention, the system can include a process for discovering contacts which are common to a group of correspondents and a new member of the group. For example, in FIG. 1, the recipient 110 can become a member of a group to which the sender 160 already belongs or is a member. Once the sender 160 requests that an electronic mail be sent by entering the unique address identifier of the recipient 110, the system can be configured to identify the recipient 110 as a new member. Once the recipient 110 has been identified as a new member, the system can automatically retrieve a single list of contacts which are common to each member of the group of correspondents, and attach the single list to the electronic mail 130. Upon receipt by the recipient 110 of the electronic message 130 with the single list of contacts attached, the common contact logic 100 can retrieve a list of contacts which are personal to the recipient 110. The common contact logic 100 can then proceed to perform a common contact search as described above. The system can then replace the single list of contacts with a new list of common contacts which can include contacts common to the group of correspondents as a whole, and the recipient 110. A copy of this new list can be retained by the recipient 110, while another copy can be forwarded to the sender 160. In any case, if no common contacts are determined between the group of correspondents and the recipient 110, the recipient 110 and the sender 160 can be so notified.

According to yet another aspect of the present invention, rather than attaching a group contact list which represents the intersection of common contacts of the group members, a group list can be attached which represents the union of all group member contacts. In that case, adding a new member to the group would increase the size of the group common contact list rather than restricting the size of the list. Accordingly, although the recipient or new group member may not have common contacts with each member of the group, the recipient would have the opportunity to discover common contacts with one or more members of the group.

Figure 3:
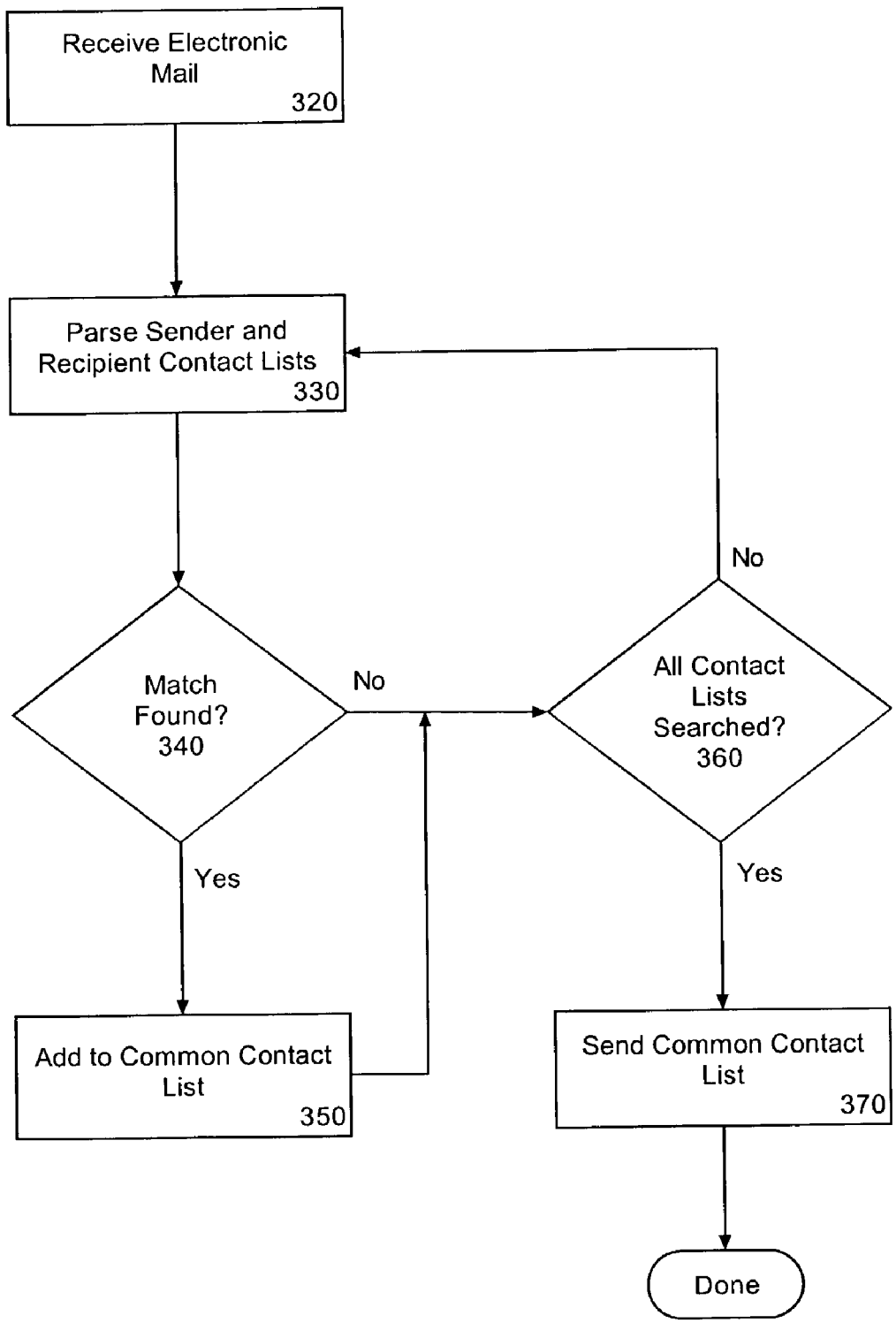
FIG. 3 is a flow chart illustrating a method for identifying common contacts among electronic mail correspondents.

FIG. 3 is a flow chart illustrating a process for identifying common contacts among electronic mail correspondents. Beginning in block 320, a recipient receives an electronic mail message from a sender with at least one contact list attached. Notably, in addition to the various embodiments discussed thus far, the contact list also can be a contact list belonging to a third party correspondent, that is a party other than the sender and the recipient. For example, the contact list can correspond to a correspondent specified in the carbon copy (cc) or blind copy (bc) portion of an electronic message. If so, the permission to attach a contact list of the third party correspondent can be specified within a profile associated with the third party correspondent which is accessible to the sender's electronic mail client.

The contact lists belonging to the sender and the recipient are parsed in block 330 for data extraction and conversion. The contact lists belonging to the sender and the recipient are then compared in block 340 to determine which, if any, contacts contained in the list of contacts belonging to the sender matches contacts contained in the list of contacts belonging to the recipient. If common contacts exist, an identifier for the matched contact or contacts can be added to a generated common contact list in block 350. After completion of step 350, the method can continue to block 360.

If no common contacts exist, the method can proceed from block 340 to block 360. In block 360, a determination can be made as to whether any additional contact lists belonging to the sender and the recipient are to be searched. If so, the next contact list can be parsed, searched, and compared in blocks 330 and 340 respectively. The method can repeat as necessary until all designated contact lists have been searched. If all designated contact lists have been searched, the sender and the recipient are each provided with a copy of the generated common contact list in block 370, and the search for common contacts can end.

Importantly, as electronic mail continues to supplant face to face communication in both business and social interactions, it is clear that a mechanism for discovering common contacts among electronic mail correspondents will be desirable. More particularly, the discovery of common contacts among electronic mail correspondents can foster trust and create closer relationships, which in turn can facilitate improved business and social interactions. Additionally, common contacts can provide an excellent source for introductions or referrals which can help to broaden one's business and social networks. Moreover, the programmatic capabilities inherent in electronic mail transactions can address the clear deficiencies in the prior art which currently rely on fallible human memory, and the labor-intensive comparison of contact lists stored in hard copy, to discover common contacts.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention also can be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following: a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for discovering contacts which are common to a sender and a recipient of an electronic message (e-mail), the method comprising the steps of:
   receiving a selection of an email recipient from a sender;
   determine whether the recipient has been included in a first list of contacts which are personal to the sender;
   if it is determined that the recipient has not been included in the first list of contacts, prompting the sender to attach the first list of contacts;
   attaching the first list of contacts to the e-mail responsive to identifying a request to attach the first list of contacts from the sender;
   retrieving a second list of contacts which are personal to the recipient;
   parsing each of the first and second lists of contacts and comparing said parsed lists to identify common contacts that are common to the sender and the recipient; and
   populating a common contact list with said identified common contacts, wherein the common contact list contains only said identified common contacts;
   wherein said common contact list is visible to the recipient, but said first list of contacts which are personal to the sender is not visible to the recipient.

2. The method of claim 1, further comprising the step of forwarding said common contact list to the sender.

3. The method of claim 1, wherein said atta/hing step further comprises the steps of:
   prompting the sender to attach at least one contact list corresponding to an e-mail correspondent other than the sender and the recipient; and
   attaching said contact list to said e-mail responsive to identifying a request to attach said contact list.

4. The method of claim 3, wherein said contact list is identified as belonging to an e-mail correspondent other than the sender and the recipient.

5. The method of claim 1, wherein the sender belongs to a group of correspondents and the recipient is a new member of the group, the method further comprising the steps of:
   identifying a request to send an electronic message (e-mail) to a new correspondent who had not previously been included as part of the group of correspondents;
   responsive to identifying said new correspondent, retrieving a single list of contacts which are common to each member of the group of correspondents; and,
   attaching said single list of contacts to said e-mail before said e-mail is forwarded to said new correspondent,
   whereby said new correspondent can generate a list of contacts which are common to said new correspondent and the group of correspondents.

6. The method of claim 5, further comprising the step of replacing said single list of contacts with a list of common contacts generated by said new correspondent.

7. The method of claim 5, further comprising the steps of:
   identifying an attachment to the electronic message (e-mail) which had been sent to the new correspondent, said attachment comprising the single list of contacts which are common to the group of correspondents;
   retrieving a list of contacts which are personal to the new member;
   parsing each said list of contacts and comparing said parsed lists to identify contacts which are common to both the new member and the group of correspondents;
   populating a common contact list with said identified common contacts; and
   forwarding said common contact list to said member of the group of correspondents.

8. The method of claim 1, wherein the sender belongs to a group of correspondents and the recipient is a new member of the group, the method further comprising the steps of:
   identifying a request to send an electronic message (e-mail) to a new correspondent who had not previously been included as part of the group of correspondents;
   responsive to identifying said new correspondent, retrieving a single list of contacts representing a union of contacts of each member of the group of correspondents; and,
   attaching said single list of contacts to said e-mail before said e-mail is forwarded to said new correspondent,
   whereby said new correspondent can generate a list of contacts representing a union of contacts of said new correspondent and the group of correspondents.

9. The method of claim 8, further comprising the step of replacing said single list of contacts with a list of contacts generated by said new correspondent.

10. The method of claim 8, further comprising the steps of:
    identifying an attachment to the electronic message (e-mail) which had been sent to the new correspondent, said attachment comprising the single list of contacts representing a union of contacts of each member of the group of correspondents;
    retrieving a list of contacts which are personal to the new member;
    parsing each said list of contacts and comparing said parsed lists to identify contacts from said list of contacts of the new member which are not included in the contacts of the group of correspondents;
    populating a new contact list with said identified contacts; and
    forwarding said new contact list to said member of the group of correspondents, wherein said new contact list represents a union of contacts of the new member and the group of correspondents.

11. A computer-readable storage having stored thereon a computer program for identifying common contacts between a sender of an electronic message (e-mail) and a recipient of said e-mail, said computer program comprising a set of instructions for causing a computer to perform the steps of:

receiving a selection of an email recipient from a sender;

determine whether the recipient has been included in a first list of contacts which are personal to the sender;

if it is determined that the recipient has not been included in the first list of contacts, prompting the sender to attach the first list of contacts;

attaching the first list of contacts to the e-mail responsive to identifying a request to attach the first list of contacts from the sender;

retrieving a second list of contacts which are personal to the recipient;

parsing each of the first and second lists of contacts and comparing said parsed lists to identify common contacts that are common to the sender and the recipient; and populating a common contact list with said identified common contacts, wherein the common contact list contains only said identified common contacts;

wherein said common contact list is visible to the recipient, but said first list of contacts which are personal to the sender is not visible to the recipient.

12. The computer-readable storage of claim 11, further comprising the step of forwarding said common contact list to the sender.

\* \* \* \* \*